(12) United States Patent
Sigl et al.

(10) Patent No.: US 9,175,761 B2
(45) Date of Patent: Nov. 3, 2015

(54) DRIVE DEVICE FOR THE ROAD WHEELS OF A VEHICLE

(71) Applicants: Horst Sigl, Passau (DE); Paul Lenz, Waldkirchen (DE); Peter Haselberger, Mauth (DE); Rudolf Neumüller, Buechlberg (DE); Klaus Alesch, Untergriesbach (DE); Alexander Enderl, Vilshofen (DE)

(72) Inventors: Horst Sigl, Passau (DE); Paul Lenz, Waldkirchen (DE); Peter Haselberger, Mauth (DE); Rudolf Neumüller, Buechlberg (DE); Klaus Alesch, Untergriesbach (DE); Alexander Enderl, Vilshofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/161,926

(22) Filed: Jan. 23, 2014

(65) Prior Publication Data

US 2014/0206492 A1   Jul. 24, 2014

(30) Foreign Application Priority Data

Jan. 24, 2013   (DE) .......................... 10 2013 201 091 U

(51) Int. Cl.
*F16H 48/38*   (2012.01)
*F16H 48/42*   (2012.01)
*B60K 17/04*   (2006.01)

(52) U.S. Cl.
CPC ............... *F16H 48/38* (2013.01); *F16H 48/42* (2013.01); *B60K 17/046* (2013.01); *F16H 2048/423* (2013.01)

(58) Field of Classification Search
CPC .... F16C 35/067; F16C 25/083; F16C 19/545; F16C 2226/60; F16H 57/021; F16H 57/037; F16H 2048/405; F16H 2048/085; F16H 48/40; F16H 2057/0221; F16H 2048/426; F16H 2048/423
USPC ........ 74/424, 606 R; 475/230, 245, 246, 253; 384/616, 620
See application file for complete search history.

(56) References Cited

U.S. PATENT DOCUMENTS

| | | | |
|---|---|---|---|
| 1,023,683 A * | 4/1912 | Royce | 475/253 |
| 1,506,037 A | 8/1924 | Alden et al. | |
| 1,506,365 A * | 8/1924 | Domizi | 475/246 |
| 1,613,566 A | 1/1927 | Melanowski | |
| 2,061,009 A * | 11/1936 | Rothrock | 475/246 |
| 2,118,760 A * | 5/1938 | Ernst | |
| 2,270,567 A * | 1/1942 | Slider | 475/251 |
| 2,546,969 A | 4/1951 | Buckendale | |
| 2,659,246 A | 11/1953 | Norelius | |
| 3,006,700 A * | 10/1961 | Hoffmann | 384/537 |
| 3,260,132 A * | 7/1966 | West et al. | 74/609 |
| 4,004,471 A | 1/1977 | Keske | |

(Continued)

*Primary Examiner* — William Kelleher
*Assistant Examiner* — Jake Cook
(74) *Attorney, Agent, or Firm* — Cozen O'Connor

(57) ABSTRACT

A drive device for the road wheels of a vehicle includes a stationary housing in which a rotatably drivable differential housing having an axle differential gear unit is rotatably mounted by differential bearings, at least one driveshaft being rotatably drivable by the differential housing. At least one driving gear wheel is arranged on the at least one driveshaft so as to be fixed with respect to rotation relative to the latter. The at least one driving gear wheel meshingly engage by oppositely directed helical teeth with at least one driven gear wheel for driving road wheels of the vehicle and generating axial forces directed toward the center of the axle differential gear unit. At least one thrust bearing arrangement is supported axially with respect to the at least one driveshaft at a radial supporting surface.

7 Claims, 1 Drawing Sheet

(56) References Cited

U.S. PATENT DOCUMENTS

| | | |
|---|---|---|
| 4,733,578 A | 3/1988 | Glaze et al. |
| 6,357,927 B1 * | 3/2002 | Myers et al. .................. 384/563 |
| 6,554,733 B2 | 4/2003 | Niebauer |
| 6,695,739 B2 | 2/2004 | Fett |
| 6,814,683 B2 | 11/2004 | Krzesicki et al. |
| 7,108,428 B2 * | 9/2006 | Ason et al. .................... 384/583 |
| 7,722,495 B1 | 5/2010 | Stanley |
| 7,775,929 B2 * | 8/2010 | Waksmundzki .............. 475/235 |
| 8,109,000 B2 | 2/2012 | Zalanca et al. |
| 2002/0031289 A1 * | 3/2002 | Kenney, Jr. .................... 384/620 |
| 2002/0183156 A1 * | 12/2002 | Gradu et al. .................. 475/220 |
| 2009/0019966 A1 | 1/2009 | Valente |
| 2010/0081535 A1 | 4/2010 | Gutsmiedl |
| 2010/0151983 A1 | 6/2010 | Ziech et al. |
| 2011/0075960 A1 | 3/2011 | White et al. |
| 2012/0295753 A1 * | 11/2012 | Kwon ........................... 475/246 |

* cited by examiner

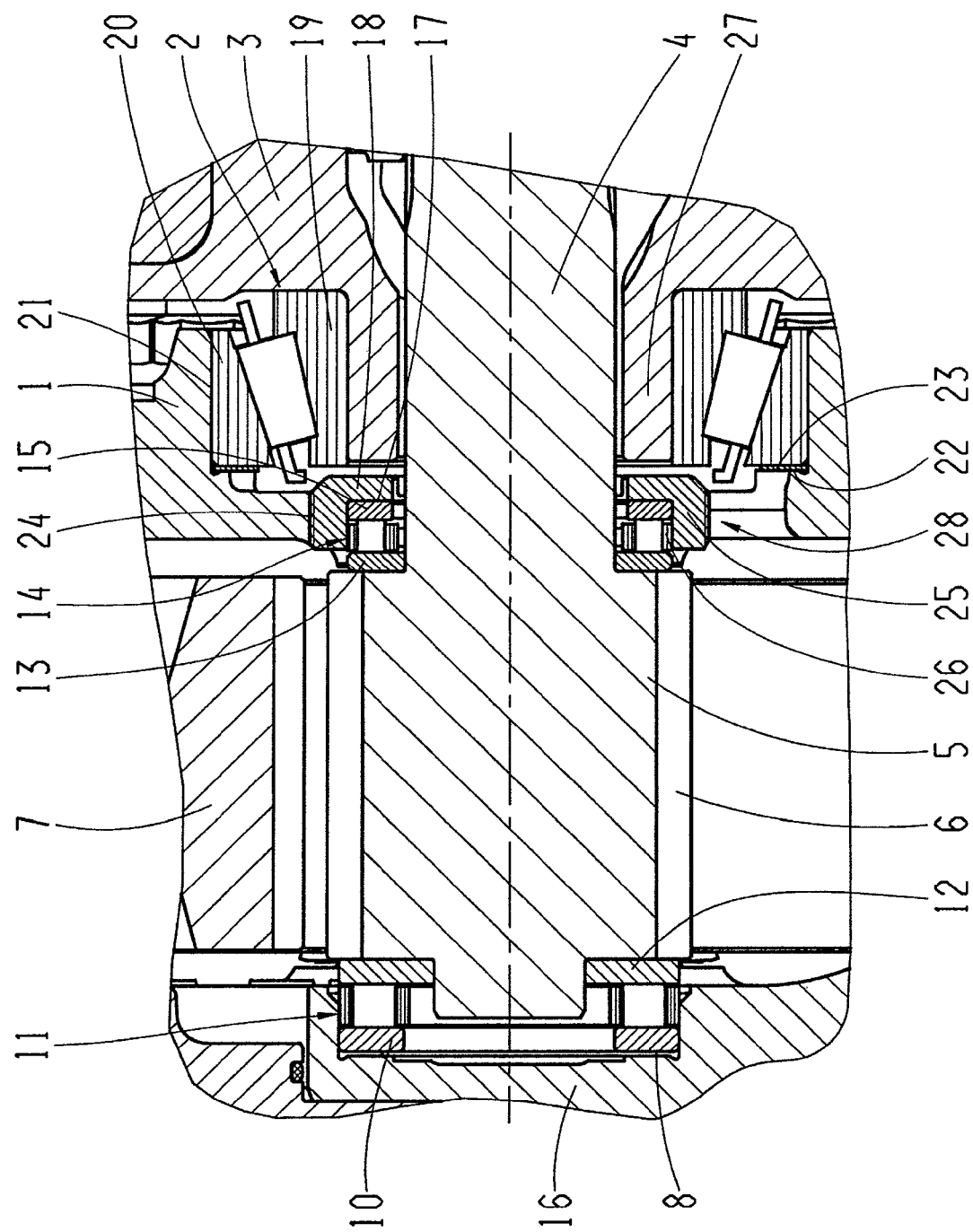

DRIVE DEVICE FOR THE ROAD WHEELS OF A VEHICLE

BACKGROUND OF THE INVENTION

1. Field of the Invention

The invention is directed to a drive device for the road wheels of a vehicle with a stationary housing in which a rotatably drivable differential housing with an axle differential gear unit is rotatably mounted by differential bearings, typically two driveshafts being rotatably drivable by the differential housing, a driving gear wheel being arranged on the two driveshafts in each instance so as to be fixed with respect to rotation relative to the latter. The driving gear wheels meshingly engage by oppositely directed helical teeth with driven gear wheels for driving road wheels of the vehicle and generate axial forces directed toward the center of the axle differential gear unit, with thrust bearing arrangements for supporting these axial forces, these thrust bearing arrangements being in turn supported at a structural component part of the drive device.

2. Description of the Related Art

In a drive device of the type mentioned above, it is known to support the axial forces of the driving gear wheels directed toward the center of the axle differential at parts of the housing that project radially between the driving wheels and the differential housing until closely adjacent to the driveshafts and have an axial guide and a radial supporting surface for the thrust bearing arrangements.

If the helix angle of the helical toothing is to be large so that higher outputs can be transmitted, there will also be an increase in the axial forces generated by the driving gear wheels and directed to the center of the axle differential and which must be supported via the thrust bearing arrangements at the parts of the housing. This requires a larger bearing arrangement and a more stable design of the parts of the housing and, therefore, a larger installation space. However, enlargement in that axial direction is impossible because the installation space is limited by the rims of the road wheels, by the tire clearance for the latter and by the differential bearings and because spacer disks must be arranged between the support points for the thrust bearing arrangements for the exact positioning of the thrust bearing arrangements.

SUMMARY OF THE INVENTION

Therefore, it is an object of the invention to provide a drive device of the type mentioned above that is constructed in a simple manner and that allows the increased axial forces generated by the driving wheels to be supported without an increased installation space requirement.

This object is met, according to a first aspect the invention, in that the thrust bearing arrangements are supported axially with respect to the driveshafts at radial supporting surfaces by supporting elements which are arranged at the housing so as to be axially displaceable.

By virtue of the axial displaceability of the supporting elements, according to one aspect, the support points for the thrust bearing arrangements can be exactly positioned so that spacer disks, which would otherwise be required for this purpose, can be dispensed with.

Accordingly, more axial space is available between the driving gear wheel and differential housing for the bearing arrangement so that the latter can be larger and, therefore, configured in a more suitable manner for higher axial forces without an increased installation space requirement.

At the same time, according to an aspect of the invention, assembly is facilitated by dispensing with the spacer disks.

Further, a larger helix angle of the helical toothing of the driving gear wheels benefits noise behavior and reduces gear tooth friction loss.

The displaceability of the supporting elements can be achieved in a simple manner and carried out easily in that the supporting elements are supporting rings having at their radially circumferential outer lateral surface a thread by which the supporting rings are screwed into threaded holes of the housing, which are coaxial to at least one the driveshaft.

The displacement of the supporting surfaces is carried out in a simple manner by means of relative rotation of the supporting rings with respect to the housing.

In a simple construction, in one aspect, the supporting ring has an adjusting sleeve having the thread at its radially circumferential outer lateral surface and, at its end facing the differential housing, an annular disk projects radially inward and which has the radial supporting surface.

When the second shaft disk is guided by its radially circumferential lateral surface at the cylindrical inner wall of the adjusting sleeve, the annular disk is held concentric to the driveshaft by the adjusting sleeve and cannot rub against the driveshaft in such a way as to produce annoying noises.

When a rolling element race of the axial rolling bearing is also guided by its radially circumferential lateral surface at the cylindrical inner wall of the adjusting sleeve, the axial rolling bearing is also held concentric to the driveshaft by the adjusting sleeve in a multifunctional manner.

According to an aspect of the invention, the driveshafts can be formed integrally with driving gear wheels associated with them, and the driveshafts can be mounted from the differential side so as to facilitate assembly.

By arranging an axially pre-loaded spring element between the shaft disk and first supporting surface, this spring element ensures that the housing disk and the shaft disk are always pre-loaded against the rolling elements of the axial rolling bearing. This prevents an impact when the play between these parts is overcome when the driveshaft changes rotational direction.

In a simple construction, the spring element can be a plate spring.

In order also to achieve an axial positioning of the differential bearing with respect to the housing corresponding to the axial positioning of the thrust bearing arrangement, each differential bearing can axially contact a radial second supporting surface of the housing via a spacer disk of determined thickness. Spacer disks of the required thickness are applied depending on the actual proportions.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWING

An exemplary embodiment of the invention is shown in the drawing and is described more fully in the following. In the drawing:

The FIGURE shows a section of a drive device for the road wheels of a vehicle.

DETAILED DESCRIPTION OF THE PRESENTLY PREFERRED EMBODIMENTS

As seen in the FIGURE, a rotatably drivable differential housing 3 of an axle differential gear, unit, not shown, is rotatably mounted in a housing 1 by two differential bearings 2, one of which is shown.

Two driveshafts 4 are rotatably drivable in a diametrically opposed manner by the axle differential gear unit. The section illustrated in the FIGURE shows the area of one of these driveshafts 4.

At its end remote of the axle differential gear unit, the driveshaft 4 is formed integral with a driving gear wheel 5 having a helical toothing 6. The driving gear wheel 5 is in meshing engagement with a driven wheel 7 such that a road wheel (not shown) of a vehicle can be driven in rotation.

The housing 1 encloses the end of the driveshaft 4 having the driving gear wheel 5. A running disk 10, a first axial cylindrical rolling bearing 11 and a first shaft disk 12 are arranged in a coaxial recess 8 of a cover 16 of the housing 1. The first shaft disk 12 axially contacts the driving gear wheel 5 in direction of the differential housing 3.

The driving gear wheel 5 is supported on the side facing the differential housing 3 at an annular radial first supporting surface 17 of an annular disk 18 which projects radially inward by—in axially successive arrangement—a housing disk 13, a rolling bearing formed as second axial cylindrical rolling bearing 14 and a second shaft disk 15.

The annular disk 18 is formed integrally with an adjusting sleeve 25 as supporting ring 28. The second shaft disk 15 and an outer rolling bearing race 26 of the second axial cylindrical rolling bearing 14 are axially guided by their radially circumferential lateral surfaces at the cylindrical inner wall of the adjusting sleeve 25.

The supporting ring 28 is provided with a thread 24 at the radially circumferential outer lateral surface and is screwed into a corresponding threaded hole of the housing 1. The annular disk 18 with the supporting surface 17 can be axially adjusted to its optimum position by rotating the supporting ring relative to the housing 1.

The inner ring 19 of the one differential bearing 2, formed as a tapered rolling bearing, is arranged on a tubular elongation 27 of the differential housing 3. The inner ring 19 contacts the differential housing 3 axially.

The outer ring 20 of the differential bearing 2 is inserted into a blind hole 21 in the housing 1 and is supported by its side remote of the differential housing 3 axially via a spacer disk 23 at the base 22 thereof, this base 22 forming a second supporting surface.

When the driveshaft 4 is driven in rotation, axial forces directed to the center of the axle differential gear unit are generated on the driveshaft 4 by the driving gear wheel 5 owing to its helical toothing 6. These axial forces are supported at the annular radial supporting surface 17 of the annular disk 18 of the supporting ring 28 by the thrust bearing arrangement comprising housing disk 13, second axial cylindrical rolling bearing 14 and second shaft disk 15.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive device for road wheels of a vehicle, the drive device comprising:
   a stationary housing (1);
   a rotatably drivable differential housing (3), the rotatably drivable differential housing (3) being rotatably mounted in the stationary housing (1) by differential bearings (2);
   at least one driveshaft (4) rotatably drivable by the rotatably drivable differential housing (3);
   at least one driving gear wheel (5) associated with and arranged on the at least one driveshaft (4), so as to be fixed with respect to rotation relative to the driveshaft (4);
   at least one driven gear wheel (7), the at least one driving gear wheel (5) meshingly engaging, by oppositely directed helical teeth, with the at least one driven gear wheel (7) to drive the road wheels of the vehicle and to generate axial forces along the driveshaft (4) towards the differential bearings (2); and
   at least one thrust bearing arrangement in contact with said at least one driving gear wheel (5) to support the axial forces along the driveshaft (4),
   wherein:
   the at least one thrust bearing arrangement is supported axially with respect to the at least one driveshaft (4) at a radial supporting surface (17) by supporting elements arranged at the stationary housing (1) so as to be axially displaceable,
   the at least one thrust bearing arrangement comprises an annular housing disk (13), directly or indirectly axially contacting the driving gear wheel (5), and an annular shaft disk (15), directly or indirectly axially contacting the radial supporting surface (17), the annular housing disk (13) and the annular shaft disk (15) surround the at least one driveshaft (4), and an axial rolling bearing (14) is arranged between the annular housing disk (13) and the annular shaft disk (15),
   the supporting elements comprise a supporting ring (28) having at its radially circumferential outer lateral surface a thread (24) by which the supporting ring (28) is screwed into threaded holes of the stationary housing (1), the threaded holes being coaxial to the at least one driveshaft (4), and
   the supporting ring (28) comprises an adjusting sleeve (25) having the thread (24) at its radially circumferential outer lateral surface and, at its end facing the differential housing (3), an annular disk (18) projecting radially inward and having the radial supporting surface (17) facing away from the differential housing (3).

2. The drive device according to claim 1, wherein the annular shaft disk (15) is guided by its radially circumferential lateral surface at the cylindrical inner wall of the adjusting sleeve (25).

3. The drive device according to claim 2, wherein the axial rolling bearing comprises a rolling element race (26) guided by its radially circumferential lateral surface at the cylindrical inner wall of the adjusting sleeve (25).

4. The drive device according to claim 1, wherein the at least one driveshaft (4) is formed integrally with at least one driving gear wheels (5).

5. The drive device according to claim 1, wherein an axially pre-loaded spring element is arranged between the shaft disk (15) and the radial supporting surface (17).

6. The drive device according to claim 5, wherein the spring element is a plate spring (24).

7. The drive device according to claim 1, wherein each differential bearing (2) axially contacts a second radial supporting surface of the stationary housing (1) via a spacer disk (23) of determined thickness.

* * * * *